(12) United States Patent
Wilson et al.

(10) Patent No.: US 7,877,430 B2
(45) Date of Patent: Jan. 25, 2011

(54) METHOD AND APPARATUS FOR ACCELERATING PROCESSING OF ADAPTIVE FINITE IMPULSE RESPONSE FILTERING

(75) Inventors: James Wilson, Foxboro, MA (US); Joshua Kablotsky, Carlisle, MA (US); Yosef Stein, Sharon, MA (US); Colm J. Prendergast, Cambridge, MA (US); Gregory M. Yukna, Norton, MA (US); Christopher M. Mayer, Dover, MA (US)

(73) Assignee: Analog Devices, Inc., Norwood, MA (US)

( * ) Notice: Subject to any disclaimer, the term of this patent is extended or adjusted under 35 U.S.C. 154(b) by 974 days.

(21) Appl. No.: 11/728,427

(22) Filed: Mar. 26, 2007

(65) Prior Publication Data

US 2008/0243981 A1    Oct. 2, 2008

(51) Int. Cl.
*G06F 17/10* (2006.01)
(52) U.S. Cl. ...................................... 708/319
(58) Field of Classification Search ........................ None
See application file for complete search history.

(56) References Cited

U.S. PATENT DOCUMENTS

| | | | | |
|---|---|---|---|---|
| 5,210,705 | A * | 5/1993 | Chauvel et al. | 702/197 |
| 5,442,576 | A * | 8/1995 | Gergen et al. | 708/209 |
| 5,600,582 | A * | 2/1997 | Miyaguchi | 708/300 |
| 5,696,959 | A * | 12/1997 | Guttag et al. | 712/245 |
| 6,332,188 | B1 * | 12/2001 | Garde et al. | 712/204 |
| 7,111,155 | B1 * | 9/2006 | Anderson et al. | 712/225 |
| 7,663,631 | B1 * | 2/2010 | Friedman et al. | 345/501 |
| 7,725,691 | B2 | 5/2010 | Stein et al. | |
| 2006/0174236 | A1 | 8/2006 | Stein et al. | |

OTHER PUBLICATIONS

International Search Report and Written Opinion for PCT Application No. 2008/003153, dated May 27, 2009 (8 pages).
U.S. Appl. No. 11/045,888, filed Stein et al.

* cited by examiner

*Primary Examiner*—David H Malzahn
(74) *Attorney, Agent, or Firm*—Bingham McCutchen LLP

(57) ABSTRACT

Finite impulse response filtering is achieved by broadcasting to at least one compute unit an instruction having a plurality of data samples, a conditional field associated with each compute unit, and a set of operator values for operating on each data sample; providing a function of each the data sample in accordance with an associated set of operator values identified by the conditional field; and combining the functions to obtain an intermediate finite impulse response of the data samples.

46 Claims, 13 Drawing Sheets

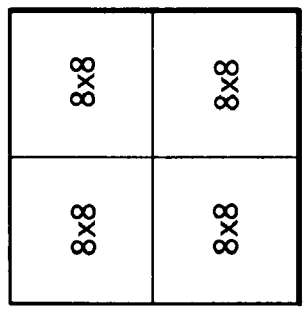
FIG. 3D
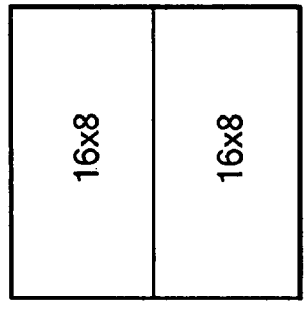
FIG. 3C
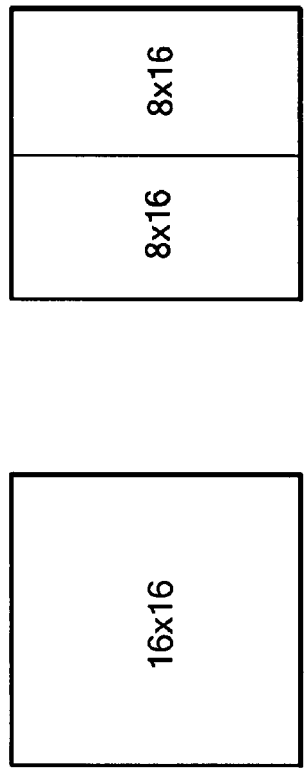
FIG. 3B
FIG. 3A
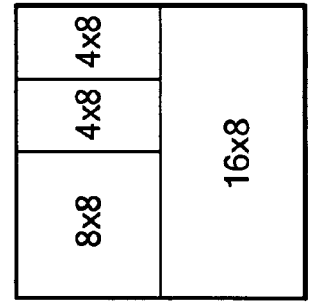
FIG. 3G
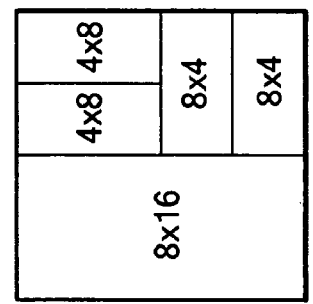
FIG. 3F
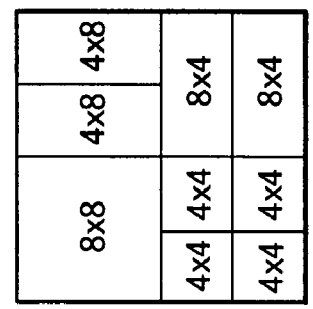
FIG. 3E

METHOD AND APPARATUS FOR ACCELERATING PROCESSING OF ADAPTIVE FINITE IMPULSE RESPONSE FILTERING

FIELD OF THE INVENTION

This invention relates to an improved method and apparatus architecture in the instruction domain for accelerating processing and more particularly to such an improved instruction architecture especially useful with processors with multiple compute units and in parallel processing of multiple data samples.

BACKGROUND OF THE INVENTION

Video compression involves encoding/decoding of pixel information in 16×16 pixels macroblocks. The new emerging standards like (MPEG4, H.264, and Windows Media) provide a flexible tiling structure in a macroblock. It allows the use of 16×16, 16×8, 8×16, 8×8, 8×4, 4×8, and 4×4 sub-macroblock sizes. A Finite Impulse Response (FIR) filter (de-blocking filter is applied to every decoded macroblock edge to reduce blocking distortion resulting from the prediction and residual difference coding stages of the decoding process. The filter is applied on both 4×4 block and 16×16 macroblock boundaries, in which three pixels on either side of the boundary may be updated using a five-tap filter. The filter coefficients set or "strength" are governed by a content adaptive non-linear filtering scheme. This is done in a number of ways. Windows Media Video decoder (wmv) uses one protocol involving the boundary strength across block boundaries. H.264 or MPEG-4 part 10 uses pixel gradient across block boundaries.

The de-blocking filter has two benefits: block edges are smoothed, improving the appearance of decoded images (particularly at higher compression ratios). And in the encoder the filtered macroblock is used for motion-compensated prediction of further frames, resulting in a smaller residual after prediction.

The 2D adaptive filter is applied to both vertical and horizontal edges of 4×4 sub-macroblocks in a macroblock, in the following order vertical first and then horizontal. Each filtering operation may affect up to three pixels on either side of the boundary. In 4×4 pixel sub-macroblocks there are 4 pixels on either side of a vertical or horizontal boundary in adjacent blocks p and q (p0,p1,p2,p3 and q0,q1,q2,q3). Depending on the coding modes of neighboring blocks and the gradient of image samples across the boundary, several outcomes are possible, ranging from (a) no pixels are filtered to (b) p0, p1, p2, q0, q1, q2 are filtered to produce output pixels P0, P1, P2, Q0, Q1 and Q2.

The choice of filtering outcome depends on the boundary block strength parameter and on the gradient of image samples across the boundary. The boundary strength parameter Bs is chosen according to the following rules:

| | | |
|---|---|---|
| p or q is (intra coded and boundary is a macroblock boundary) | Bs = 4 (strongest filtering) | $P_0, P_1, P_2,$ $Q_0, Q_1, Q_2$ |
| p or q is intra coded and boundary is not a macroblock boundary | Bs = 3 | $P_0, P_1,$ $Q_0, Q_1$ |
| neither p or q is intra coded; p or q contain coded coefficients | Bs = 2 | $P_0, P_1,$ $Q_0, Q_1$ |
| neither p or q is intra coded; neither p or q contain coded coefficients; p and q have different reference frames or a different number of reference frames or different motion vector values | Bs = 1 | $P_0, P_1,$ $Q_0, Q_1$ |
| neither p or q is intra coded; neither p or q contain coded coefficients; p and q have same reference frame and identical motion vectors | Bs = 0 (no filtering) | |

The filter sample level decision (ap==[1,0] for the left side of the filter, and aq==[1,0] for the right side of the filter) depends on the pixel gradient across block boundaries. The purpose of that decision is to "switch off" the filter when there is a significant change (gradient) across the block boundary or to filter very strongly when there is a very small change (gradient) across the block boundary which is likely to be due to image blocking effect. For example, if the pixel gradient across an edge is below a certain slice threshold (ap/aq=1) then a five tap filter (a strong filter) is applied to filter P0, if not (ap/aq=0) then a three tap filter (a weak filter) is applied. In a single compute unit processors the selection between which of the filters to apply is done using If/else, jump instructions. The sequencer must jump over the second filter instruction stream if the first one is selected or jump over the first one if the second one is selected. These jump (If/else) instructions are acceptable in a single compute unit processors but not in a multi-compute unit processors such as a single instruction multiple data (SIMD) processors.

Since an SIMD processor can solve similar problems in parallel on different sets of local data it can be characterized as n times faster than a single compute unit processor where n is the number of compute units in the SIMD. However, this benefit only is available for sequential types of problems such as FIR, FFT, and DTC, IDCT, etc. The need for SIMD type processing for non-sequential instruction streams is increasing as image size increases.

However, in such multiple compute unit processors where a single sequencer broadcasts a single instruction stream which drives each of the compute units on different local data sets, e.g. the pixel gradient at block boundaries, the conduct of each compute unit may be different, jump/not jump; and to where—depending upon the effect of the common instruction on the individualized local data, and the sequencer cannot take a decision if to jump/not jump that satisfies all the compute units. Therefore, the high speed and efficiency of SIMD processors has not been applied to the family of non-sequential instructions e.g. conditional (if/else, jump) type of problems.

In the current generation of vector SIMD processors this problem can be solved by deriving from a sequence of instructions a generic instruction having an index section and compute section and broadcasting that generic instruction to the multiple compute units, where the index section is applied to localized data stored in each compute unit to select one of a plurality of stored local parameter sets and applying in each compute unit the selected parameters to the local data according to the compute section to produce each compute unit's localized solution to the generic instruction.

BRIEF SUMMARY OF THE INVENTION

It is therefore an object of this invention to provide a multiple compute unit processor and method for accelerating processing of finite impulse response filtering.

It is a further object of this invention to provide such a multiple compute unit processor and method which increases computing speed by nearly n times where n is the number of compute units.

It is a further object of this invention to provide such a multiple compute unit processor and method which avoids jumps which interrupt the operation of deep pipeline processors.

It is a further object of this invention to provide such a multiple compute unit processor and method which can reduce the data memory needed to perform the filtering.

It is a further object of this invention to provide such a multiple compute unit processor and method which is flexible enough to solve all conditional and non-conditional finite impulse response filtering.

This invention results from the realization that an improved finite impulse response filtering can be achieved by broadcasting to at least one compute unit an instruction having a plurality of data samples, a conditional field associated with each compute unit, and a set of operator values for operating on each data sample; providing a function of each data sample in accordance with an associated set of operator values identified by the conditional field and combining said functions to obtain an intermediate finite impulse response of said data samples. The conditional field may identify a set of shift values and the compute unit may include a conditional shift unit responsive to the conditional field for providing a shifted value of the data samples in accordance with a one of the set of shift values identified by the conditional field. Or the conditional field may identify a set of coefficient values and the compute unit may include a conditional multiplier unit responsive to the conditional field for providing a multiplied value of the data sample in accordance with a one of the set of coefficient values identified by the conditional field.

The subject invention, however, in other embodiments, need not achieve all these objectives and the claims hereof should not be limited to structures or methods capable of achieving these objectives.

This invention features a programmable processor for performing finite impulse response filtering including a sequencer configured to generate an instruction having at least two data samples, a conditional field and a set of operator values for operating on each data sample; and a compute unit responsive to the conditional field for providing a function of each the data sample in accordance with an associated set of operator values identified by the conditional field and for combining the functions to obtain an intermediate finite impulse response of the data samples.

In a preferred embodiment the compute unit may include an accumulator for combining the functions to obtain an intermediate finite impulse response of the data samples. The conditional field may identify a set of shift values and the compute unit may include a conditional shift unit responsive to the conditional field for providing a shifted value of the data samples in accordance with a one of the set of shift values identified by the conditional field. The conditional shift unit may include a shift circuit associated with each shift value and a selector circuit responsive to the conditional field for selecting the output of one of the shift circuits. The conditional shift unit may include a shift circuit and a selector circuit responsive to the conditional field to apply one of the shift values to the shift circuit. The compute unit may include an arithmetic logic unit (ALU) for accumulating the shifted values of the data samples. The shift values for each data sample may be the same and the conditional field may be bypassed. The processor may include a plurality of compute units, each including a sequencer configured to generate an instruction having at least one data sample, a conditional field and a set of shift values for each data sample; and a compute unit including a conditional shift unit responsive to the conditional field for providing a shifted value of the data sample in accordance with a one of the set of shift values identified by the conditional field. The instruction may include a plurality of data samples, a conditional field associated with each compute unit; and a set of shift values for each data sample. The shift values may include a nulling value for selectively setting the shifted data sample value to zero. One of the shift values may include a zero value for leaving the data sample unchanged. The processor may be a single instruction multiple data (SIMD) processor. The processor may include a loop filter for performing finite impulse response filtering. The data samples may include image pixels arranged in sub-macroblock tiles. Each compute unit may receive the image pixels in at least one column of a sub-macroblock tile. Each compute unit may receive the image pixels in a pair of columns of a sub-macroblock tile. Each compute unit may be associated with a different pair of the columns and responds to a respective pair of the conditional fields to independently select one of the shifted data samples values. The conditional fields may be the same. The data samples may be contained in a data register of the compute unit. The conditional field may identify a set of coefficient values and the compute unit includes a conditional multiplier unit responsive to the conditional field for providing a multiplied value of the data sample in accordance with a one of the set of coefficient values identified by the conditional field. The conditional multiplier unit may include a multiplier circuit associated with each coefficient value and a selector circuit responsive to the conditional field for selecting the output of one of the multiplier circuits. The conditional multiplier unit may include a multiplier circuit and a selector circuit responsive to the conditional filed to apply one of the coefficient values to the multiplier circuit. The compute unit may include an arithmetic logic unit (ALU) for accumulating the multiplied values of the data samples. The multiplied values for each data sample may be the same and the conditional field may be bypassed. The processor may include a plurality of compute units, each including a sequencer configured to generate an instruction having at least one data sample, a conditional field and a set of coefficient values for each data sample; and a compute unit including a conditional multiplier unit responsive to the conditional field for providing a multiplied value of the data sample in accordance with a one of the set of coefficient values identified by the conditional field; the instruction may include a plurality of data samples, a conditional field associated with each compute unit; and a set of coefficient values for each data sample. One of the shift values may include a nulling value for selectively setting the multiplied data sample value to zero. One of the multiplied values may include a multiplication identity value for leaving the data sample unchanged. The identity value may be a zero.

This invention also features a method of performing finite impulse response filtering including broadcasting to at least one compute unit an instruction having a plurality of data samples, a conditional field associated with each compute unit, and a set of operator values for operating on each data sample; providing a function of each the data sample in accordance with an associated set of operator values identified by the conditional field; and combining the functions to obtain an intermediate finite impulse response of the data samples.

In a preferred embodiment the conditional field may identify a set of shift values and a shifted value of the data sample may be provided in accordance with a one of the set of shifted values identified by the conditional field. The data sample may be shifted in accordance with each of the shift values and one of the shifted sample values may be selected as identified by the conditional field. The data sample may be shifted in accordance with a one of the shift values identified by the conditional field. The shifted values of the data samples may be accumulated. The shift values for each data sample may be the same and the conditional field may be bypassed. One of the shift values may include a nulling value for selectively setting the shifted data sample value to zero. The shift values may include a zero value for leaving the data sample unshifted. The data samples may include image pixels arranged in sub-macroblock tiles. Each compute unit may receive the image pixels in at least one column of a sub-macroblock tile. Each compute unit may receive the image pixels in a pair of columns of a sub-macroblock tile. Each compute unit may be associated with a different pair of the columns and may respond to a respective pair of the conditional fields to independently select one of the functions of the data sample values. The conditional fields may be the same. The conditional field may identify a set of coefficient values and a multiplied value of the data sample may be provided in accordance with a one of the set of coefficient values identified by the conditional field. The data sample may be multiplied in accordance with each of the coefficient values and one of the multiplied sample values may be selected as identified by the conditional field. The data sample may be multiplied in accordance with a one of the coefficient values identified by the conditional field. The multiplied values of the data samples may be accumulated. The coefficient values for each data sample may be the same and the conditional field may be bypassed. One of the coefficient values may include a nulling value for selectively setting the multiplied data sample value to zero. One of the coefficient values may include a multiplication identity value for leaving the data sample unchanged. The identity value may be zero.

BRIEF DESCRIPTION OF THE DRAWINGS

Other objects, features and advantages will occur to those skilled in the art from the following description of a preferred embodiment and the accompanying drawings, in which:

FIG. 3A-G are examples of sub-macroblocks tiling structure in a macroblock;

DISCLOSURE OF THE PREFERRED EMBODIMENT

Figure 1:
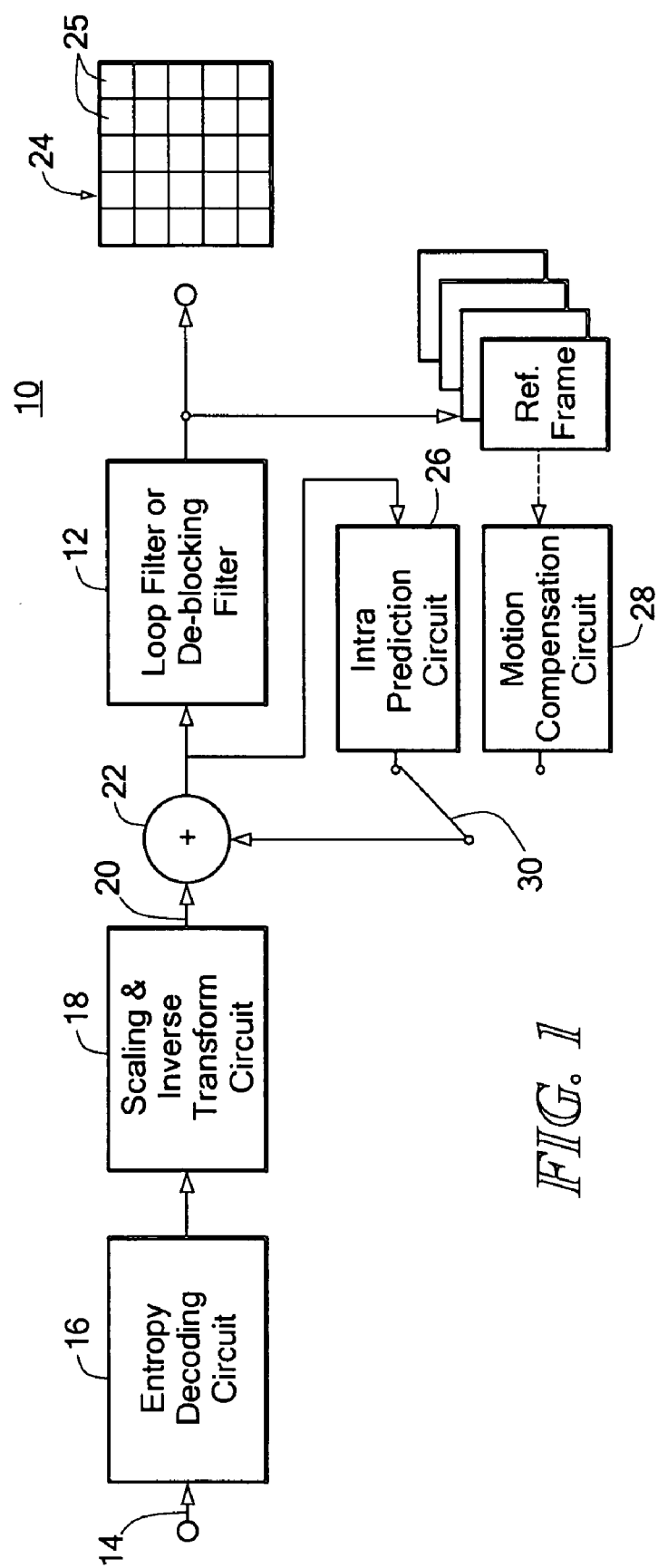
FIG. 1 is a block diagram of a video decoder with a loop filter employing this invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

The preferred embodiment disclosed herein is described in the environment of a video system wherein an image is compressed and encoded in 16×16 pixel macroblocks and then streamed to a decoder. The invention resides in a loop filter or de-blocking filter which is used in both the encoder and the decoder of such systems.

There is shown in FIG. 1 a video decoder 10 in a receiver of such a system which uses a loop filter or de-blocking filter 12. In operation the compressed bit stream representing the image made of 16×16 pixel macroblocks is delivered to the input 14 of entropy decoding circuit 16. The decoded coefficients are submitted to scaling and inverse transform circuit 18 whose outputs are the residual macroblock data for the current macroblock. This is supplied on line 20 to summing circuit 22. The output of summing circuit 22 comprising the reconstructed macroblock is submitted to loop filter or de-blocking filter 12. The output of filter 12 is the reconstructed image 24 in the form of 16×16 pixel tiled macroblocks 25 which have been reassembled and have had their boundaries filtered to restore the picture to the desired quality. The output of loop filter 12 is also used to reconstruct the reference frames. The intra prediction circuit 26 uses unfiltered previous decoded macroblocks to predict current macroblock data. The motion compensation circuit 28 uses out of order predicted (P) and bidirectional predicted (B) reference frames to reconstruct current macroblock data. Depending on the macroblock type (intra, inter) switch 30 position is set and the intra predicted macroblock 26 or the motion compensated macroblock 28 is added in summing circuit 22 to the residual macroblock data 20 to generate the current reconstructed macroblock. In the remainder of this particular embodiment the discussion will be focused on operation with the switch 30 in the intra prediction position.

Figure 2:
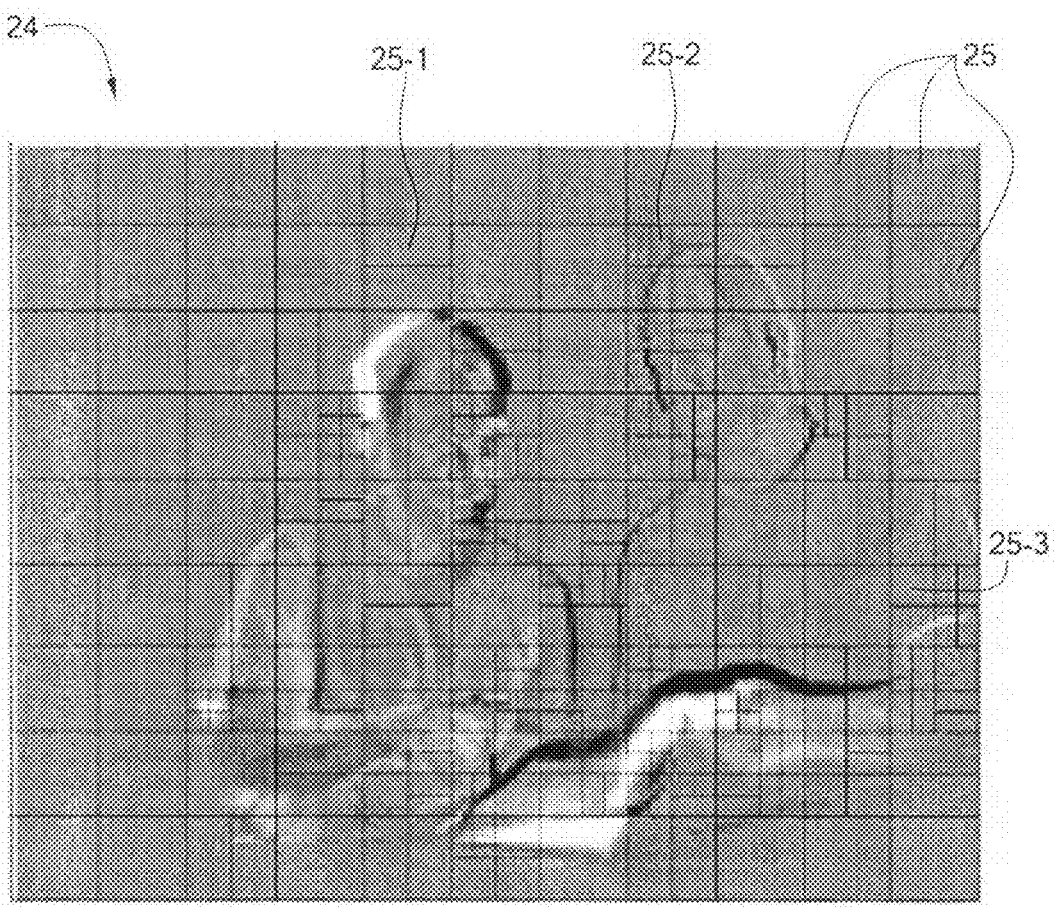
FIG. 2 is a schematic illustration of an image with macroblocks and sub-macroblocks superimposed.

An example of such an image, FIG. 2, shows that while many of the macroblocks 25, in the areas where there is not a lot of detail, are kept in single unitary 16×16 pixel macroblocks: in areas where the color, tonality and other features change, the macroblock may be broken into one or more sub-macroblocks, such as shown in macroblocks 25-1, 25-2 and 25-3, for example. The decision of whether to further sub-divide the macroblocks and how to further sub-divide them into sub-macroblocks is dictated by the encoder and the targeted bit rate. For example, in non-real time encoding applications such as DVD's the encoder can run all possible macroblock partitions and select the one that needs the minimum number of bits to encode that macroblock. On the other hand in real time encoding the encoder can't run all possible macroblock partitions but the encoder still seeks for the first (sub-optimal) macroblock partitions that satisfies the desired bit rate.

A sampling of the various combinations is shown in FIG. 3A-G, where it can be seen: FIG. 3A shows a unitary macroblock of 16×16 pixels; FIG. 3B shows a macroblock composed of two 8×16 sub macroblocks; FIG. 3C shows an macroblock composed of two 16×8 sub macroblocks; FIG. 3D shows an macroblock composed of four 8×8 sub-macroblocks. The macroblock in FIG. 3E includes one 8×8 sub-macroblock, two 4×8 sub-macroblocks, four 4×4 sub-macroblocks and two 8×4 sub-macroblocks. In FIG. 3F, the macroblock includes one 8×16 sub-macroblock, two 4×8 sub-macroblocks and two 8×4 sub-macroblocks. And in FIG. 3G, the macroblock includes one 8×8 sub-macroblock, two 4×8 sub-macroblocks and one 16×8 sub-macroblock.

The actual coding and decoding of images using the macroblock and sub macroblock procedure involves both luma and chroma pixel information. This embodiment of the invention is explained only with respect to the luma information but applies equally as well to the chroma information.

Figure 4:
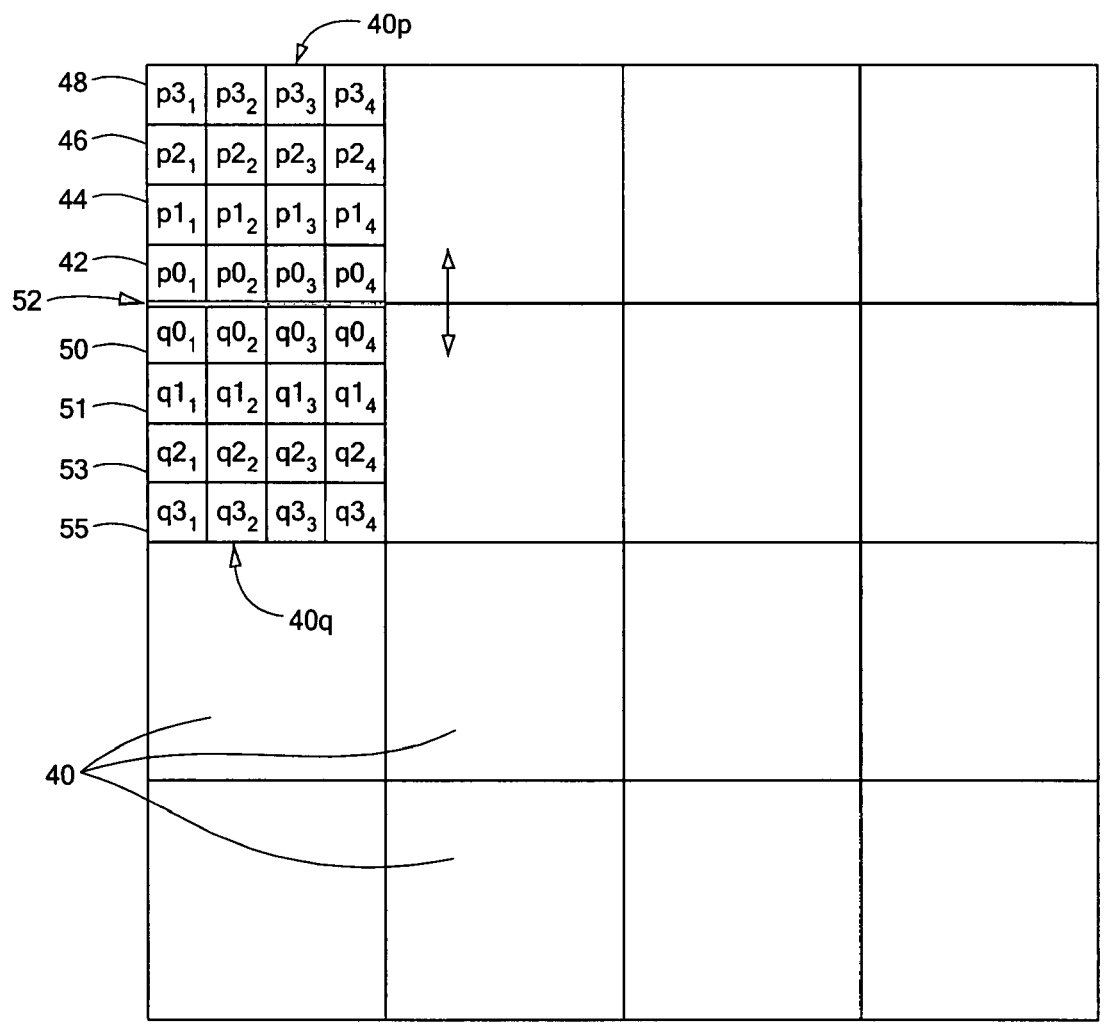
FIG. 4 is a schematic diagram of a 16×16 pixel macroblock with sixteen 4×4 pixel sub-macroblocks.

There is shown in FIG. 4, a typical macroblock 25 composed of 16 sub-macroblock 40 of 4×4 pixels or 16 pixel size. Sub-macroblock 40p includes four rows 42, 44, 46, and 48 of four pixels each. The first row 42 has the pixels named, $p0_1$, $p0_2$, $p0_3$ $p0_4$; the corresponding row 50 in sub-macroblock 40q has its four pixels identified as $q0_1$, $q0_2$, $q0_3$, $q0_4$. The remaining rows 44, 46, 48, and 51, 53, 55 are named in a similar fashion. By way of example assume that the border 52 between sub-macroblocks 40p and 40q is the border or boundary to be filtered in this example. In the boundary level there are actually four filter "strengths" that can be used to filter the pixels on either side of that boundary in each row which are identified as indicated in the background as Bs=1, 2, 3, 4, Bs=0 means no filtering. Filter strength Bs=4 is the highest and it involves three out of the four pixels in each row $p_0$-$p_2$ and $q_0$-$q_2$. The lowest strength Bs=1, 2 and 3 effect only $p_0$, $p_1$, $q_0$ and $q_1$. The particular filter strength is governed by a content adaptive non-linear filtering scheme which is well defined by the coded specification. The filter is "stronger" at places where is likely to be significant blocking distortion, such as the boundary of an intra coded macroblock or a boundary between blocks that contain coded coefficients. For example, in the H.264 codec referred to in the Background, supra, in the sample level the filter strength ap/aq will be adapted by a function of the pixel gradient across block boundaries where ap is the pixel gradient across the p pixels and aq is the pixel gradient across q pixels. In other codecs, such as, Windows Media Video (.wmv) and MPEG-4 this is a function of boundary strength across block boundaries, where the filter strength will be adapted by comparing a running sum of "ψ" function across the filtered edge against a threshold. ψ function is defined as:

$$\Psi = \begin{cases} 1 & \text{if } |Pixel_i - Pixel_{i+1}| < \text{threshold (where } i = 0 \text{ to filter length)} \\ 0 & \text{else} \end{cases}$$

In this example the explanation will be with reference to the H.264 codec specification. In H.264 the pixel gradient function across block boundaries are defined as:

$$\begin{cases} ap = |p_2 - p_0| < Beta & (1) \\ aq = |q_2 - q_0| < Beta & (2) \end{cases}$$

Where Beta is a slice threshold set by H.264 encoder to adapt the amount of the reconstructed image filtering.

Assuming the filter at the boundary 52 is to be Bs=4, the processor that executes the adaptive finite impulse response (FIR) loop filter or de-blocking filter has two choices: if ap equals 1 then the processor must carry out the three filters to update $P_0$, $P_1$ and $P_2$ as shown in equations (3), (4) and (5).

$$P_0=(p_2+2p_1+2p_0+2q_0+q_1)/8 \tag{3}$$

$$P_1=(p_2+p_1+p_0+q_0)/4 \tag{4}$$

$$P_2=(2p_3+3P_2+p_1+p_0+q_0)/8 \tag{5}$$

If ap is not 1, that is, if it equals 0 then only one filter need be carried out to update $P_0$ as shown in equation (6) and leave $P_1$=$p_1$ and P2=p2 (unchanged).

$$P_0=(2p_1+p_0+q_1)/4 \tag{6}$$

An identical set of equations depending on aq=[0,1] would be used to process $Q_0$-$Q_3$ only in those equations the P's and Q's would be reversed and the equations would be being solved for $Q_0$, $Q_1$, $Q_2$ and equation (6) would be solved for $Q_0$.

Thus, if both filter powers were to be Bs=4 and if both pixel gradients ap and aq were equal to one the filtering for this row 42, FIG. 4, could be carried out by parallel processing in two identical compute units. However, this cannot be assured for while the $p_0$-$p_3$ filtering may by ap=1, the $q_0$-$q_3$ filtering may be aq=0. If they were both 1 then both compute units could in parallel move through operations (3), (4), and (5). Or if ap and aq both equal 0 the two compute units could in parallel move through operation (6). But if they are different one compute unit must perform operations as shown in (3), (4), and (5), while the other is simply doing the one operation of (6). That is, they are no longer parallel processing in the true sense. In one case the operations would involve (3), (4), and (5) and then jump over operation (6), whereas in the other case, operation (3), (4), and (5) would be jumped over to go directly to operation (6). These, if, else, or jump, or non-sequential type of instructions are not workable in multiple compute unit processors with deep pipeline stages. The jumps break the flow and require many cycles to clear the pipeline of old instructions and fill it up with the new instructions.

As disclosed in U.S. patent application Ser. No. 11/045, 888, filed Jan. 28, 2005, entitled METHOD AND APPARATUS FOR ACCELERATING PROCESSING OF A NON-SEQUENTIAL INSTRUCTION STREAM ON A PROCESSOR WITH MULTIPLE COMPUTE UNITS by Stein et al. herein incorporated in its entirety by this reference, even though different operations are to be performed, parallel processing can take place in two or more compute units. This is done by converting the non sequential instructions, such as shown in equations (3), (4), (5) and (6) to a more generalized generic instruction that carries both operations within it where the values are represented as shift values. There is broadcast to the SIMD array an instruction stream having a plurality of data samples, a conditional field associated with each compute unit and a set of shift values, to add or subtract in each of the local compute unit's accumulator a shifted value of the input data samples in accordance with one of the set of shift values identified by the local conditional field. For example, the non-sequential instructions represented by the equations (3) and (6) for $P_0$ can be generalized as follows. For ap=1 equation (3) can be rewritten as $$P_0 = \frac{p2}{8} + \frac{2p1}{8} + \frac{2p0}{8} + \frac{2q0}{8} + \frac{q1}{8} \quad (7)$$

and for ap=0 equation (6) can be rewritten as $$P_0 = \frac{2p1}{4} + \frac{p0}{4} + \frac{q1}{4} \quad (8)$$

Equation (7) can then be generalized to:

$$\frac{2p0}{8} + \frac{2p1}{8} + \frac{p2}{8} + \frac{2q0}{8} + \frac{q1}{8} \quad (9)$$

and equation (8) can be generalized to:

$$\frac{p0}{4} + \frac{2p1}{4} + \ldots \frac{q1}{4} \quad (10)$$

and it can be seen that equation (9) and equation (10) are in the same form except that equation (10) for $P_0$ and ap=0 has no $p_2$ or $q_0$ term. The generic instruction stream can be represented as:

$$p_0 \!>\!>\! 2 + p_1 \!>\!>\! 2 + p_2 \!>\!>\! 3 + q_0 \!>\!>\! 2 + q_1 \!>\! 3 \quad (11)$$

And equation (10) can be written as:

$$p_0 \!>\!>\! 2 + p_1 \!>\!>\! 1 + p_2 \!>\!>\! 8 + q_0 \!>\!>\! 8 + q_1 \!>\!>\! 2 \quad (12)$$

Where pi>>8 is equivalent to mulling the contribution of an 8 bit pixel i to the filter output.

The generic instruction can be represented as:

$$p_0 \!>\!>\! (ap?2{:}2) + p_1 \!>\!>\! (ap?2{:}1) + p_2 \!>\!>\! (ap?3{:}8) + q_0 \!>\!>\! (ap?2{:}8) + q_1 \!>\!>\! (ap?3{:}2) \quad (13)$$

where all the terms $p_0$, $p_1$, $p_2$, $q_0$, $q_1$, in both equations (11) and (12) are represented with accompanying shift values associated with each data sample and a conditional field for each conditional shift unit to accumulate a shifted value of the data sample in accordance with one of shift values identified by the conditional field. There may be a number of conditional shift units associated with each compute unit and there may be a number of compute units.

In accordance with this invention the finite impulse response filtering can be achieved by broadcasting to at least one compute unit an instruction having a plurality of data samples, a conditional field associated with each compute unit, and a set of operator values for operating on each data sample. A function of each data sample is provided in accordance with an associated set of operator values identified by the conditional field. The functions are then combined to obtain an intermediate finite impulse response of the data samples.

In one embodiment the conditional field identifies a set of shift values and the compute unit includes a conditional shift unit responsive to the conditional field for providing a shifted value of the data sample in accordance with a one of the set of shift values identified by the conditional field and in another embodiment the conditional field identifies a set of coefficient values and the compute unit includes a conditional multiplier unit responsive to the conditional field for providing a multiplied value of the data sample in accordance with a one of the set of coefficient values identified by the conditional field. One of the coefficient values may include a multiplication identity value for leaving the data sample unchanged. Or one of the coefficient values may include a multiplication identity value of zero for nulling or setting the multiplied data sample to zero.

Figure 5:
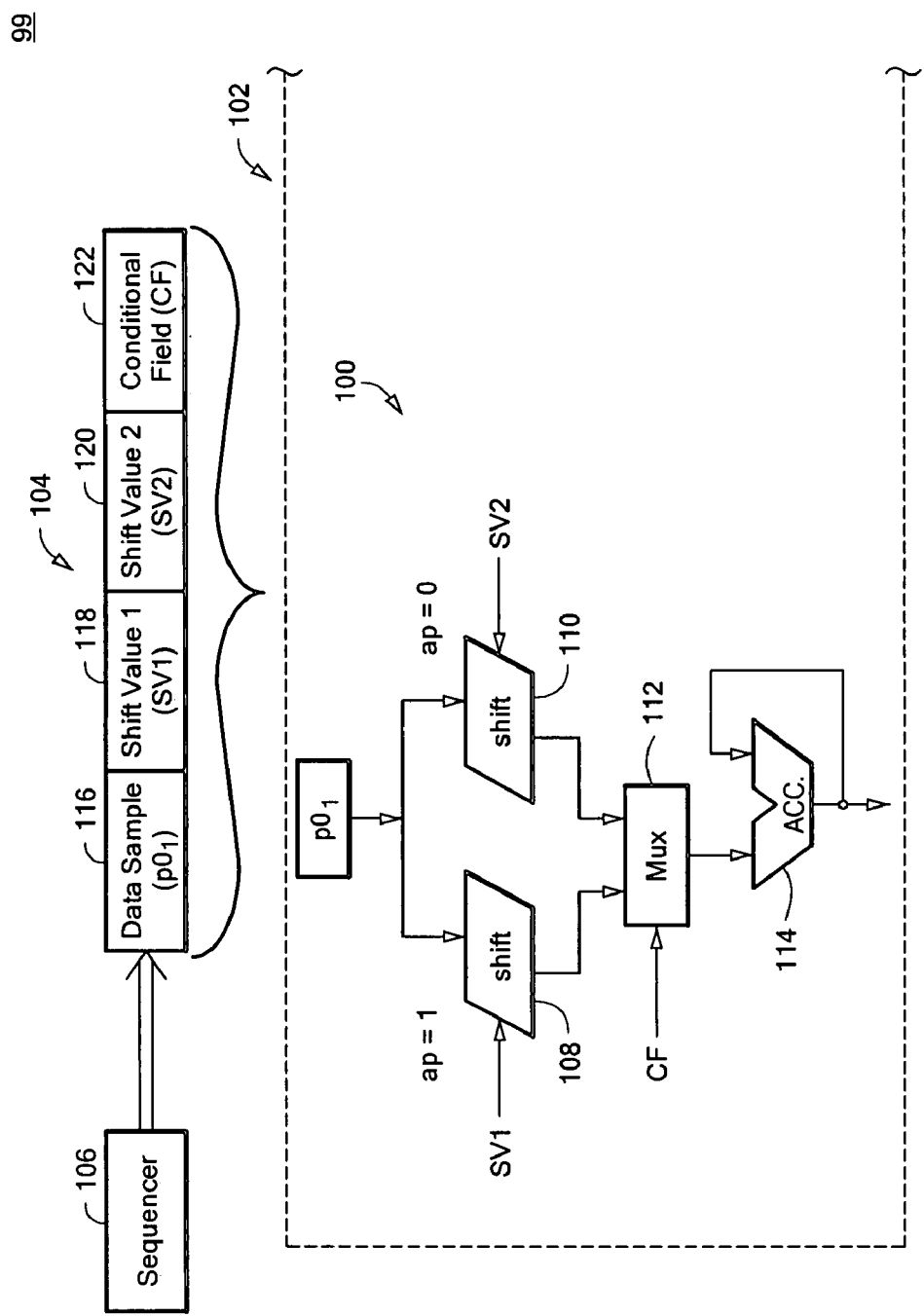
FIG. 5 is a schematic block diagram of a portion of a compute unit including a conditional shift unit and accumulator for processing a single data sample with a sequencer and instruction according to this invention.

There is shown in FIG. 5 a processor 99 implementing the shifting embodiment according to this invention including a conditional shift circuit 100 in a compute unit 102 and sequencer 106. Sequencer 106 provides an instruction 104 to operate conditional shift circuit 100. Conditional shift circuit 100 includes shifters 108, 110, mux 112 and there is an accumulator 114. Instruction 104 carries a data sample 116, shift value 1 (SV1) 118, shift value 2 (SV2) 120 and a conditional field 122. In operation data sample 116, for example, poi, is delivered to both shifters 108 and 110 simultaneously. Each shifter 108, 110 shifts the $p0_1$ value by an amount identified by the shift values SV1, SV2, respectively. In this example, SV1 will function to execute the ap=1 option while SV2 will function to execute the ap=0 option. Both shifted values of $p0_1$ are delivered to mux 112 which selects one of them for delivery to accumulator 114 in accordance with the command CF from conditional field 122.

Variously the shifter values SV1, SV2 may be the same, bypassing the conditional field function, or they may be different. They may contain a nulling value for setting the shifted value of $p0_1$ to zero or they may contain a zero for leaving the data sample unchanged. In this way the data sample $p0_1$ may be processed quickly as to both the ap options with a minimum of hardware and machine cycles.

Figure 5A:
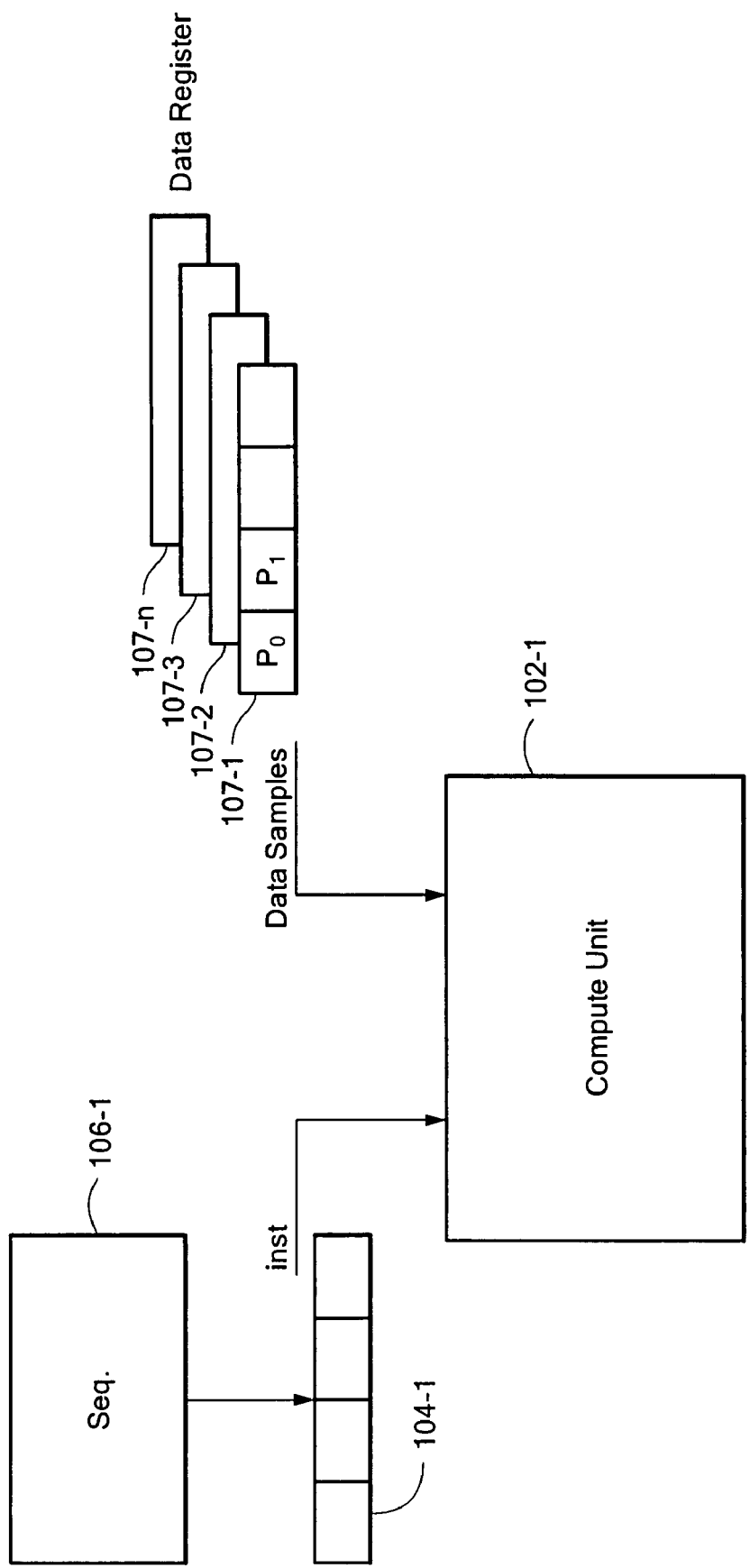
FIG. 5A is a block diagram of an alternative arrangement for provision of a data sample.

While thus far the instruction provided by the sequencer includes both conditional fields and shift/multiplier values and data samples this is not a necessary limitation of the invention. For, as shown in FIG. 5A instruction 104-1 may contain all but the data samples and the data samples may be provided from one or more data registers 107-1, 107-2, 107-3 ... $107_n$.

Figure 6:
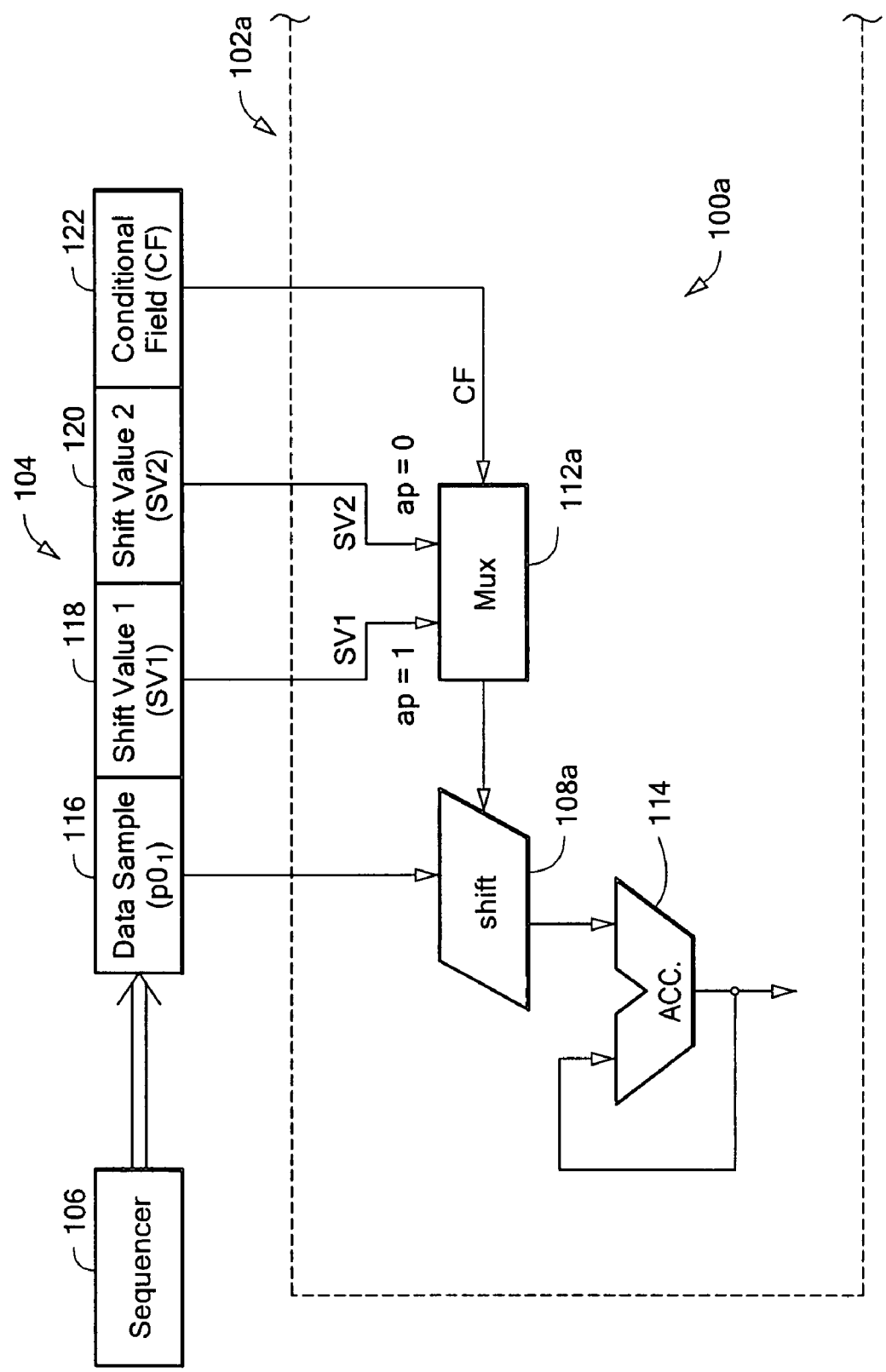
FIG. 6 is a view similar to FIG. 5 of an alternative construction for a conditional shift unit.

Instruction 104 may be executed in processor 99a, FIG. 6, by an alternative construction of a conditional shift unit 100a in which the conditional field CF is applied to the mux 112a to command shifter 108a to shift by either SV1 or SV2 to execute ap=1 or ap=0, for example.

Figure 7:
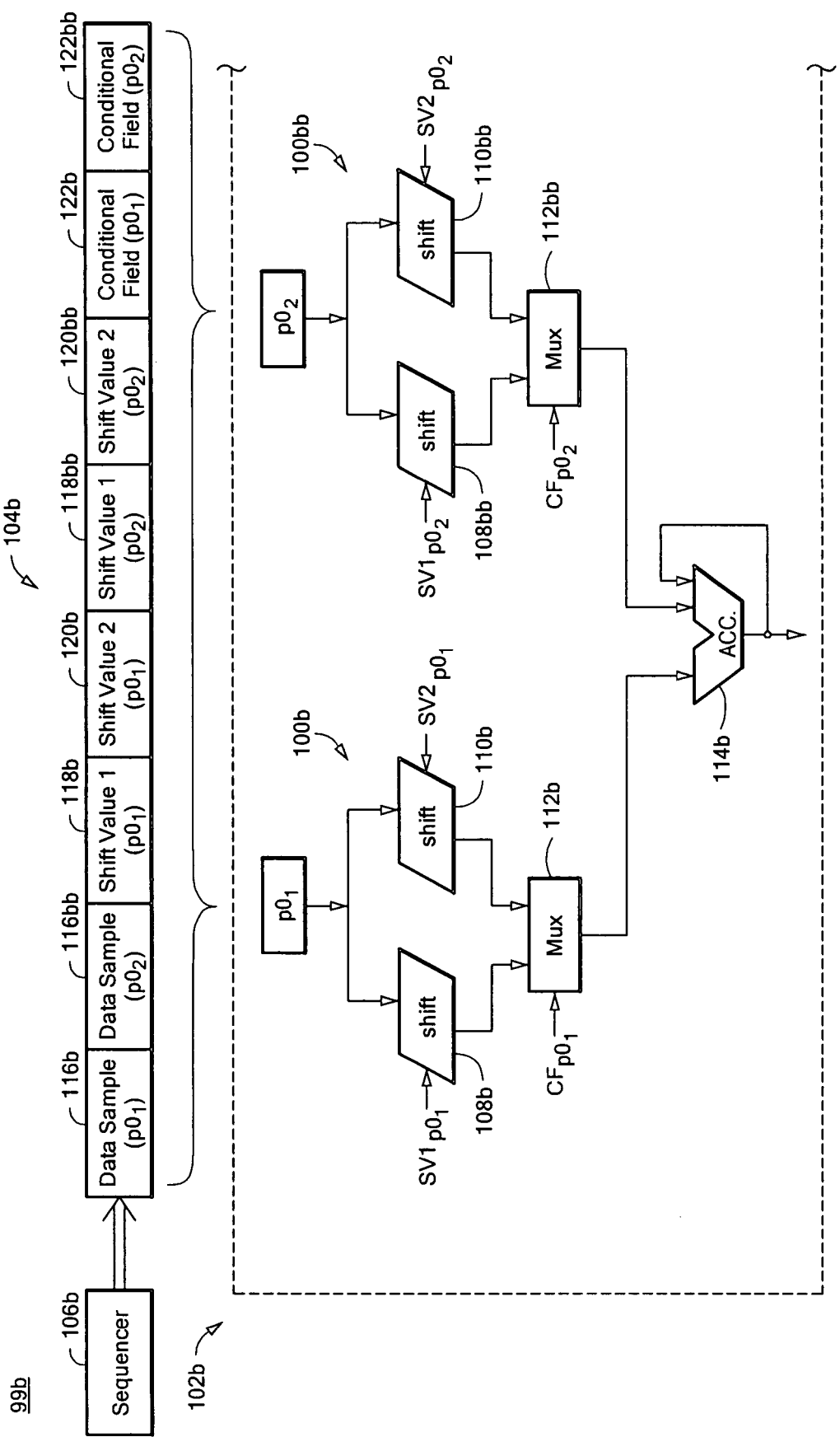
FIG. 7 is a view similar to FIG. 5 with two conditional shift units for processing two data samples simultaneously.

The benefits of the inventions are even more realizable as shown in processor 99b, FIG. 7, processing a pair of pixels in each compute unit using multiple conditional shift units where, for example, two conditional shift units 100b, 100b respond to instruction 104b which contains two data samples $p0_1$ 116b and $p0_2$ 116bb, two shift values associated with each: SV1$p0_1$, SV2$p0_1$, SV1$p0_2$, SV2$p0_2$, and a conditional field CF$p0_1$, and CF$p0_2$ associated with each conditional shift circuit 100b and 100bb all respectively. In operation data sample 116b, $p0_1$, shift values 118b, 120b, $SV1p0_1$, $SV2p0_1$, and conditional field 122b, CEp0, are applied to conditional shift unit 100b and data sample 116bb, $p0_2$, shift values 118bb, 120bb, $SV1p0_2$, $SV2p0_2$ and conditional field 122bb, $CFp0_2$ are applied to conditional shift circuit 100bb. The shifted value whether it be zero, null, positive or negative of $p0_1$ and $p0_2$ are then delivered by muxes 112b, 112bb to be added or subtracted from the previous result by accumulator 114b.

Figure 8:
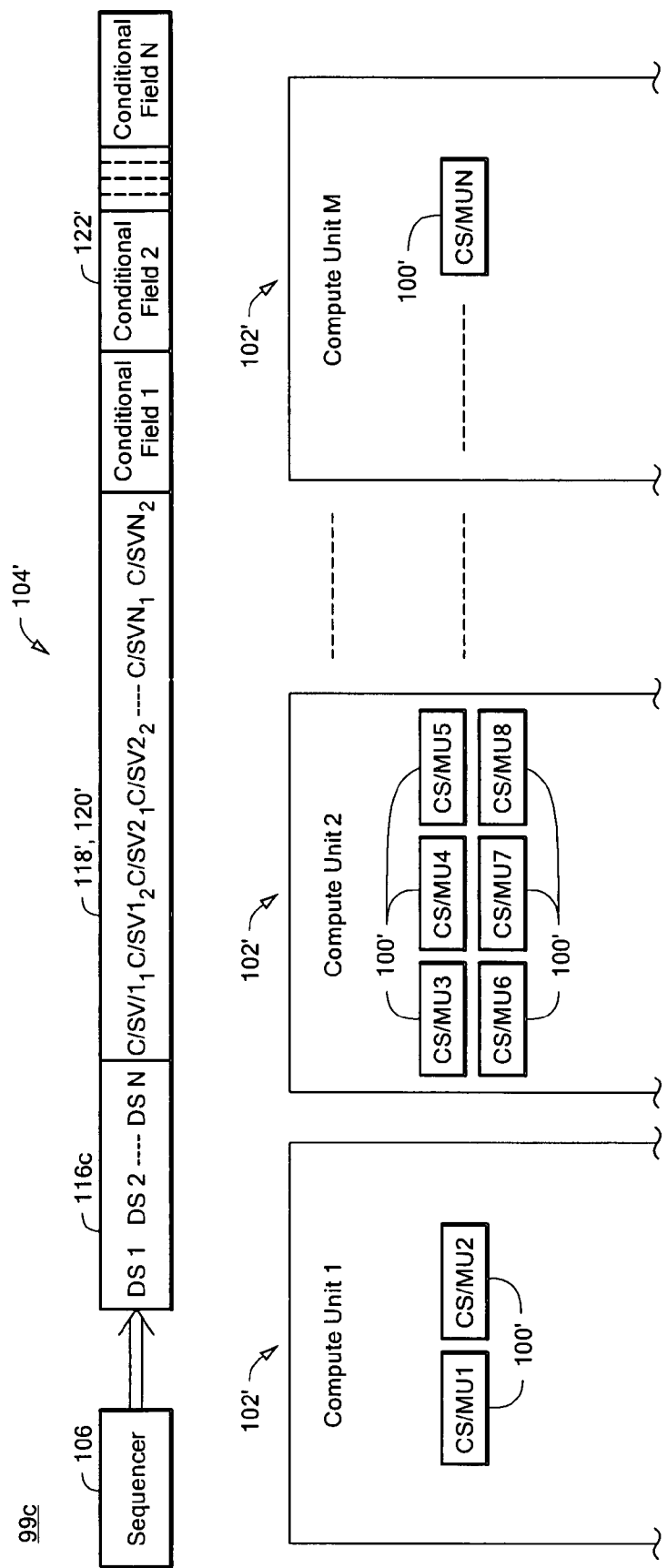
FIG. 8 is a schematic block diagram of a processor with multiple compute units and a sequencer.

The invention is not limited to having a separate condition field for each pixel of the pixel pair: they both can share the same one. It is equally applicable to a number of conditional shift/multiplier units, three, four or many more. There may be one or more conditional shift/multiplier units in each compute unit and there may be a plurality of compute units as shown in FIG. 8 where a processor 99c according to this invention includes a number M of compute units 102' together having a total of N conditional shift/multiplier units 100'. Instruction 104' commensurately has N data samples 116', N sets of coefficient/shift values 118' and 120', SV1, SV2 and N conditional fields 122' CF. Processor 99, a,b,c may be e.g., a loop filter, or SIMD processor.

Figure 7A:
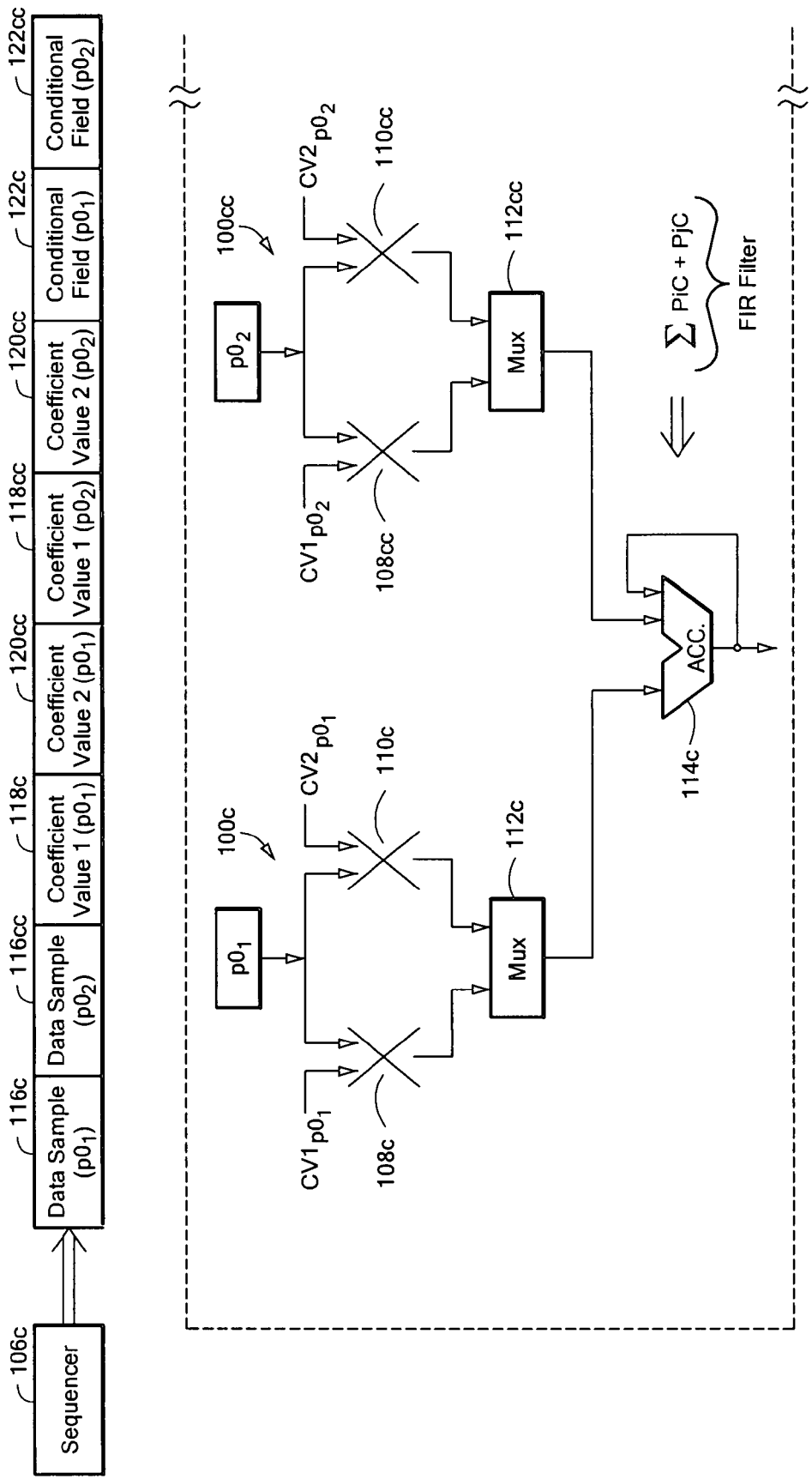
FIG. 7A is a view similar to FIG. 7 with two conditional multiplier units for processing two data samples simultaneously.

An embodiment employing multipliers instead of shifters is shown in FIG. 7A where in instruction 104c the shift values have been replaced by coefficient values 118c, 120c, 118cc, 120cc and compute unit 102c in place of conditional shift circuit employs, conditional multiplier units 108c, 110c, 108cc, 110cc.

Figure 9:
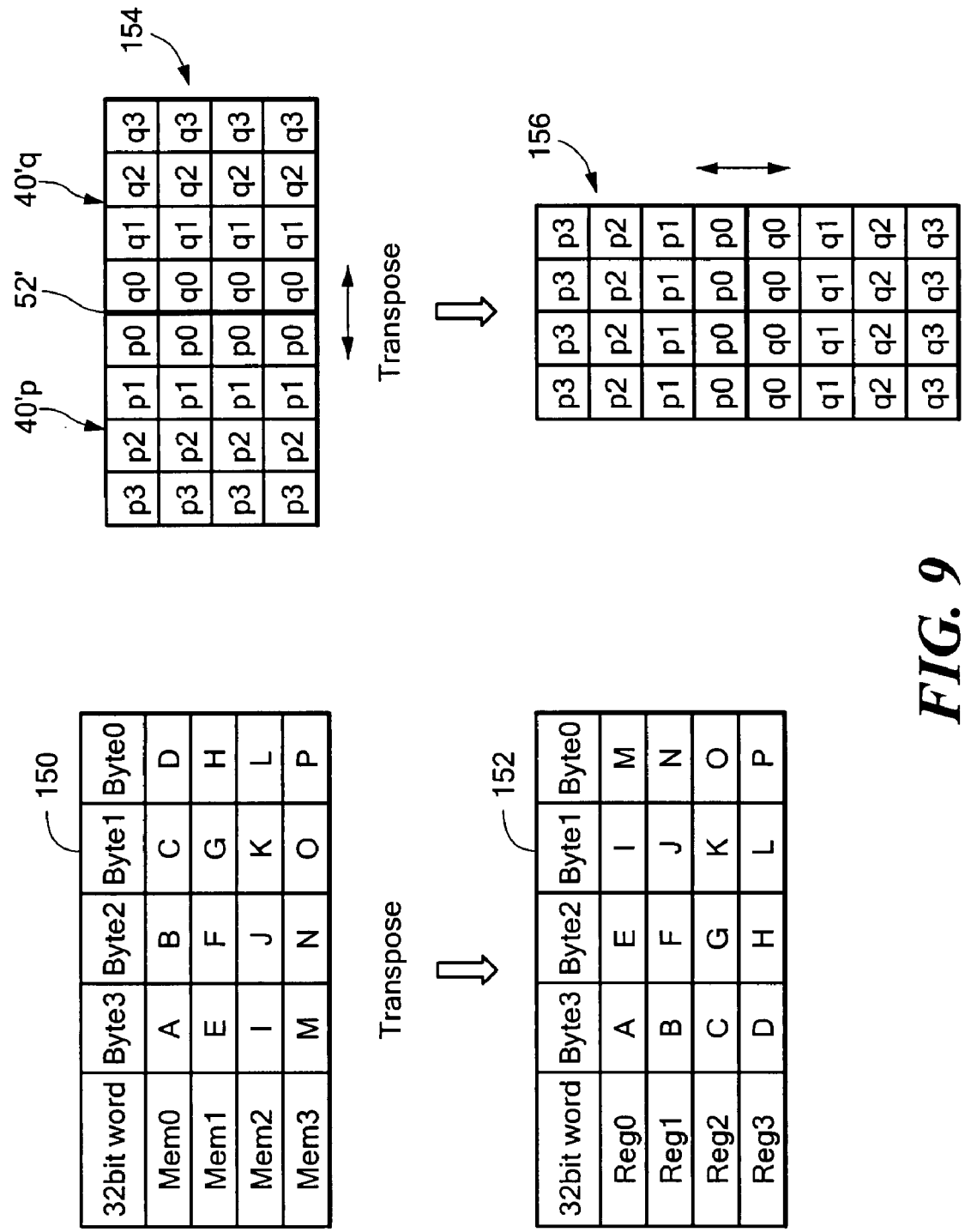
FIG. 9 is an illustration of a transposition of the pixel data samples to accommodate the natural data flow of the processor.

While the natural order of processors is suited to the arrangement of pixels p and q as shown in FIG. 4 for filtering horizontal edge 52, the invention applies as well to filtering a vertical edge 52', FIG. 9 by effecting the transposition from the array 150 to array 152 to convert the configuration 154 to the more naturally ordered configuration 156 like that shown in FIG. 4 as taught in U.S. patent application Ser. No. 11/045, 888, filed Jan. 28, 2005, entitled METHOD AND APPARATUS FOR ACCELERATING PROCESSING OF A NON-SEQUENTIAL INSTRUCTION STREAM ON A PROCESSOR WITH MULTIPLE COMPUTE UNITS by Stein et al. previously cited herein and incorporated by reference.

Figure 10:
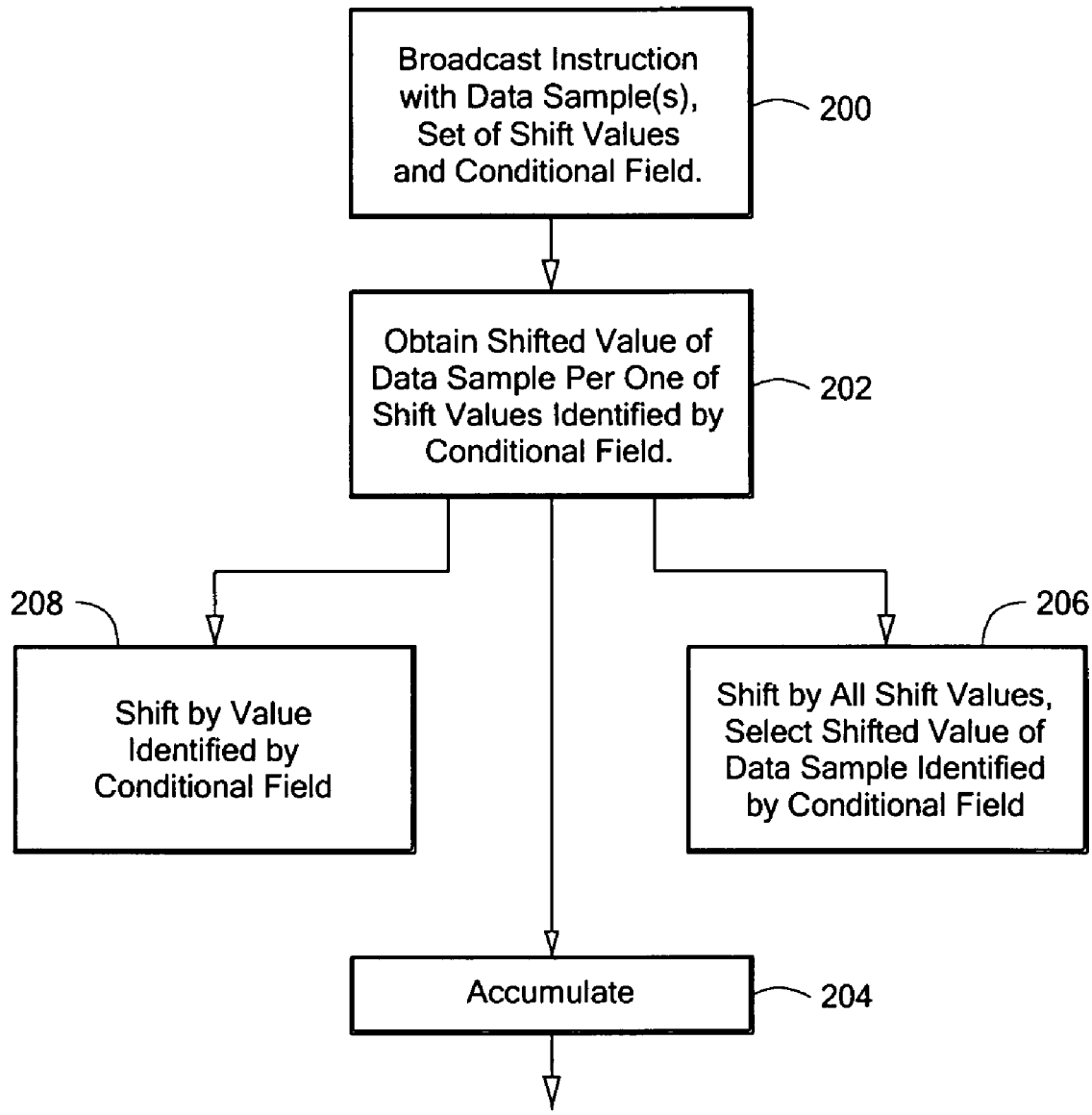
FIG. 10 is a diagram of the method of this invention employing shifting.

The invention includes the method including broadcasting an instruction with data sample(s), set(s) of associated shift values and conditional field(s), 200, FIG. 10, and obtaining the shifted value of the data sample(s) per one of the shift value(s) identified by the associated conditional field 202 and then accumulating the result 204. The conditional shift may be effected either by shifting each data sample by all associated shift values and then selecting the shifted value of each data sample as identified by the associated conditional field 206 or identifying with the conditional field the selected shift value and shifting the data sample only by that shift value, 208.

Figure 11:
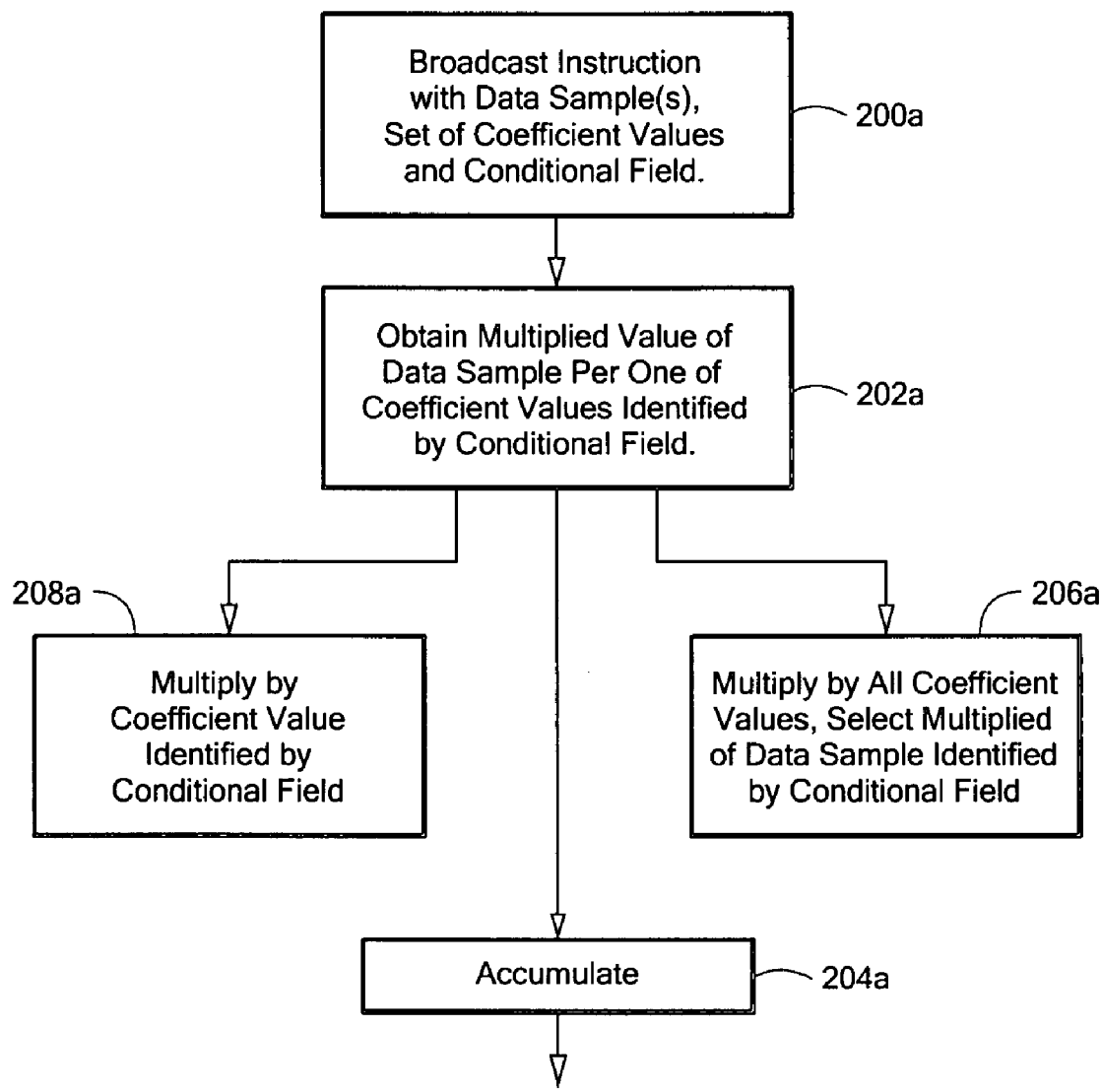
FIG. 11 is a diagram of the method of this invention employing multiplication.

The invention also includes the method including broadcasting an instruction with data sample(s), set(s) of associated coefficient values and conditional field(s), 200a, FIG. 11, and obtaining the multiplied value of the data sample(s) per one of the coefficient value(s) identified by the associated conditional field 202a and then accumulating the result 204a. The conditional multiplication may be effected either by multiplying each data sample by all associated coefficient values and then selecting the multiplied value of each data sample as identified by the associated conditional field 206a or identifying with the conditional field the selected coefficient value and multiplying the data sample only by that coefficient value, 208a. One of the coefficient values may include a multiplication identity value for leaving the data sample unchanged. Or one of the coefficient values may include a multiplication identity value of zero for nulling or setting the multiplied data sample to zero.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. A programmable processor for performing finite impulse response filtering comprising:
   a sequencer configured to generate an instruction having at least two data samples, a conditional field and a set of operator values for operating on each data sample; and
   a compute unit responsive to said conditional field for providing a function of each said data sample in accordance with an associated set of operator values identified by said conditional field and for combining said functions to obtain an intermediate finite impulse response of said data samples.

2. The programmable processor for performing finite impulse response filtering of claim 1 in which said compute unit includes an accumulator for combining said functions to obtain an intermediate finite impulse response of said data samples.

3. The programmable processor for performing finite impulse response filtering of claim 1 in which the associated set of operator values identified by said conditional field comprises a set of shift values and said compute unit includes a conditional shift unit responsive to said conditional field for providing a shifted value of said data samples in accordance with one of said set of shift values identified by said conditional field.

4. The programmable processor for performing finite impulse response filtering of claim 3 in which said conditional shift unit includes a shift circuit associated with each shift value and a selector circuit responsive to said conditional field for selecting the output of one of said shift circuits.

5. The programmable processor for performing finite impulse response filtering of claim 3 in which said conditional shift unit includes a shift circuit and a selector circuit responsive to said conditional field to apply one of said shift values to said shift circuit.

6. The programmable processor for performing finite impulse response filtering of claim 3 in which said compute unit includes an arithmetic logic unit (ALU) for accumulating the shifted values of said data samples.

7. The programmable processor for performing finite impulse response filtering of claim 3 in which said shift values for each data sample are the same and said conditional field is bypassed.

8. The programmable processor for performing finite impulse response filtering of claim 3 in which said processor includes a plurality of compute units, each including a sequencer configured to generate an instruction having at least one data sample, a conditional field and a set of shift values for each data sample; and a compute unit including a conditional shift unit responsive to said conditional field for providing a shifted value of said data sample in accordance with one of said set of shift values identified by said conditional field; said instruction including a plurality of data samples, a conditional field associated with each compute unit; and a set of shift values for each data sample.

9. The programmable processor for performing finite impulse response filtering of claim 3 in which one of said shift values includes a nulling value for selectively setting the shifted data sample value to zero.

10. The programmable processor for performing finite impulse response filtering of claim 3 in which one of said shift values includes a zero value for leaving the data sample unchanged.

11. The programmable processor for performing finite impulse response filtering of claim 1 in which said processor is a single instruction multiple data (SIMD) processor.

12. The programmable processor for performing finite impulse response filtering of claim 1 in which said processor includes a loop filter for performing finite impulse response filtering.

13. The programmable processor for performing finite impulse response filtering of claim 1 in which said data samples include image pixels arranged in sub-macroblock tiles.

14. The programmable processor for performing finite impulse response filtering of claim 13 in which each said compute unit receives the image pixels in at least one column of a sub-macroblock tile.

15. The programmable processor for performing finite impulse response filtering of claim 14 in which each said compute unit receives the image pixels in a pair of columns of a sub-macroblock tile.

16. The programmable processor for performing finite impulse response filtering of claim 14 in which each said compute unit is associated with a different pair of said columns and responds to a respective pair of said conditional fields to independently select one of the shifted data samples values.

17. The programmable processor for performing finite impulse response filtering of claim 16 in which said conditional fields are the same.

18. The programmable processor for performing finite impulse response filtering of claim 1 in which said data samples are contained in a data register of said compute unit.

19. The programmable processor for performing finite impulse response filtering of claim 1 in which the associated set of operator value identified by said conditional field comprises a set of coefficient values and said compute unit includes a conditional multiplier unit responsive to said conditional field for providing a multiplied value of said data sample in accordance with a one of said set of coefficient values identified by said conditional field.

20. The programmable processor for performing finite impulse response filtering of claim 19 in which said conditional multiplier unit includes a multiplier circuit associated with each coefficient value and a selector circuit responsive to said conditional field for selecting the output of one of said multiplier circuits.

21. The programmable processor for performing finite impulse response filtering of claim 19 in which said conditional multiplier unit includes a multiplier circuit and a selector circuit responsive to said conditional filed to apply one of said coefficient values to said multiplier circuit.

22. The programmable processor for performing finite impulse response filtering of claim 19 in which said compute unit includes an arithmetic logic unit (ALU) for accumulating the multiplied values of said data samples.

23. The programmable processor for performing finite impulse response filtering of claim 19 in which said multiplied values for each data sample are the same and said conditional field is bypassed.

24. The programmable processor for performing finite impulse response filtering of claim 19 in which said processor includes a plurality of compute units, each including a sequencer configured to generate an instruction having at least one data sample, a conditional field and a set of coefficient values for each data sample; and a compute unit including a conditional multiplier unit responsive to said conditional field for providing a multiplied value of said data sample in accordance with one of said set of coefficient values identified by said conditional field; said instruction including a plurality of data samples, a conditional field associated with each compute unit; and a set of coefficient values for each data sample.

25. The programmable processor for performing finite impulse response filtering of claim 19 in which said one of said shift values includes a nulling value for selectively setting the multiplied data sample value to zero.

26. The programmable processor for performing finite impulse response filtering of claim 19 in which said one of said multiplied values includes a multiplication identity value for leaving the data sample unchanged.

27. A method of performing finite impulse response filtering comprising:
broadcasting to at least one compute unit an instruction having a plurality of data samples, a conditional field associated with each compute unit, and a set of operator values for operating on each data sample;
providing a function of each said data sample in accordance with an associated set of operator values identified by said conditional field; and
combining said functions to obtain an intermediate finite impulse response of said data samples.

28. The method of performing finite impulse response filtering of claim 27 in which the associated set of operator values identified by said conditional field comprises a set of shift values and a shifted value of each said data sample is provided in accordance with one of said set of shifted values identified by said conditional field.

29. The method of performing finite impulse response filtering of claim 28 in which the data sample is shifted in accordance with each of said shift values and one of said shifted sample values is selected as identified by said conditional field.

30. The method of performing finite impulse response filtering of claim 28 in which the data sample is shifted in accordance with one of the shift values identified by said conditional field.

31. The method of performing finite impulse response filtering of claim 28 further including accumulating the shifted values of said data samples.

32. The method of performing finite impulse response filtering of claim 28 in which said shift values for each data sample are the same and said conditional field is bypassed.

33. The method of performing finite impulse response filtering of claim 28 in which said one of said shift values includes a nulling value for selectively setting the shifted data sample value to zero.

34. The method of performing finite impulse response filtering of claim 28 in which said one of said shift values includes a zero value for leaving the data sample unshifted.

35. The method of performing finite impulse response filtering of claim 27 in which said data samples include image pixels arranged in sub-macroblock tiles.

36. The method of performing finite impulse response filtering of claim 35 in which each said compute unit receives the image pixels in at least one column of a sub-macroblock tile.

37. The method of performing finite impulse response filtering of claim 36 in which each said compute unit receives the image pixels in a pair of columns of a sub-macroblock tile.

38. The method of performing finite impulse response filtering of claim 37 in which each said compute unit is associated with a different pair of said columns and responds to a respective pair of said conditional fields to independently select one of the functions of the data sample values.

39. The method of performing finite impulse response filtering of claim 38 in which said conditional fields are the same.

40. The method of performing finite impulse response filtering of claim 27 in which the associated set of operator values identified by said conditional field comprises a set of coefficient values and a multiplied value of said data sample is provided in accordance with one of said set of coefficient values identified by said conditional field.

41. The method of performing finite impulse response filtering of claim 40 in which the data sample is multiplied in accordance with each of said coefficient values and one of said multiplied sample values is selected as identified by said conditional field.

42. The method of performing finite impulse response filtering of claim 40 in which the data sample is multiplied in accordance with one of the coefficient values identified by said conditional field.

43. The method of performing finite impulse response filtering of claim 40 further including accumulating the multiplied values of said data samples.

44. The method of performing finite impulse response filtering of claim 40 in which said coefficient values for each data sample are the same and said conditional field is bypassed.

45. The method of performing finite impulse response filtering of claim 40 in which said one of said coefficient values includes a nulling value for selectively setting the multiplied data sample value to zero.

46. The method of performing finite impulse response filtering of claim 40 in which said one of said coefficient values includes a multiplication identity value for leaving the data sample unchanged.

* * * * *